United States Patent
Bex et al.

(10) Patent No.: US 9,862,354 B2
(45) Date of Patent: Jan. 9, 2018

(54) WIPER BLADE DEVICE

(75) Inventors: Koen Bex, Jeuk (BE); Dirk Herinckx, Linter (BE); Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 238 days.

(21) Appl. No.: 13/994,061

(22) PCT Filed: Nov. 11, 2011

(86) PCT No.: PCT/EP2011/069909
§ 371 (c)(1),
(2), (4) Date: Jun. 13, 2013

(87) PCT Pub. No.: WO2012/079869
PCT Pub. Date: Jun. 21, 2012

(65) Prior Publication Data
US 2013/0263402 A1    Oct. 10, 2013

(30) Foreign Application Priority Data
Dec. 13, 2010 (DE) .................. 10 2010 062 902

(51) Int. Cl.
*B60S 1/38* (2006.01)
*B60S 1/40* (2006.01)
*B60S 1/04* (2006.01)

(52) U.S. Cl.
CPC ............ *B60S 1/0408* (2013.01); *B60S 1/381* (2013.01); *B60S 1/3851* (2013.01); *B60S 1/3856* (2013.01); *B60S 1/3863* (2013.01); *B60S 1/3853* (2013.01); *B60S 1/3881* (2013.01); *B60S 2001/3818* (2013.01); *Y10T 29/49826* (2015.01)

(58) Field of Classification Search
CPC .... B60S 1/3849; B60S 1/3851; B60S 1/3853; B60S 1/3856; B60S 1/3858; B60S 1/381; B60S 1/40; B60S 1/3881; B60S 1/0408; B60S 2001/3818

See application file for complete search history.

(56) References Cited

U.S. PATENT DOCUMENTS

| 2007/0174989 | A1  | 8/2007  | Moll et al. |
| 2008/0222831 | A1* | 9/2008  | Thienard ............ 15/250.32 |
| 2008/0295273 | A1  | 12/2008 | Lin et al. |

(Continued)

FOREIGN PATENT DOCUMENTS

| CN | 1310679    | 8/2001  |
| CN | 1676383    | 10/2005 |
| DE | 102005062462 | 6/2007 |

(Continued)

OTHER PUBLICATIONS

Machine translation of description portion of French publication 2925437, dated Jun. 2009.*

(Continued)

*Primary Examiner* — Gary Graham
(74) *Attorney, Agent, or Firm* — Michael Best & Friedrich LLP (57) ABSTRACT

The invention is based on a wiper blade device comprising a wiper strip unit (12) which has a wiper strip element (14), a wind-deflector unit (15) and a wiper lip (18). According to the invention, the wind-deflector unit (15) has at least two separate wind-deflector elements (16).

12 Claims, 6 Drawing Sheets

(56) References Cited

U.S. PATENT DOCUMENTS

2009/0056049 A1* 3/2009 Jarasson et al. ........... 15/250.32
2010/0293737 A1* 11/2010 Ollier ........................ 15/250.34

FOREIGN PATENT DOCUMENTS

| DE | 102005062462 A1 * | 6/2007 |
|----|----|----|
| DE | 102006047633 | 4/2008 |
| DE | 102008001015 | 10/2009 |
| DE | 102008001045 | 10/2009 |
| DE | 102008040033 A1 * | 12/2009 |
| EP | 2090479 | 8/2009 |
| EP | 2127969 * | 12/2009 |
| FR | 2890026 | 3/2007 |
| FR | 2925437 | 6/2009 |
| KR | 2009042785 | 4/2009 |
| RU | 2238198 | 10/2004 |
| WO | 2010/091757 | 8/2010 |

OTHER PUBLICATIONS

International Search Report for Application No. PCT/EO2011069909 dated Jan. 12, 2012 (3 pages).

* cited by examiner

WIPER BLADE DEVICE

BACKGROUND OF THE INVENTION

The invention is based on a wiper blade device.

A wiper blade device with a wiper strip unit which comprises a wiper strip element, a wind deflector unit and a wiper lip is already known in the art.

SUMMARY OF THE INVENTION

The invention is based on a wiper blade device with a wiper strip unit which comprises a wiper strip element, a wind deflector unit and a wiper lip.

It is proposed that the wind deflector unit exhibits at least two wind deflector elements configured separately from one another, by virtue of which material savings can be made during assembly in a particularly simple manner. A "wiper strip unit" in this context should be particularly taken to mean a unit which is provided to connect a wiper blade adapter to a wiper lip. "Provided" should be taken to mean specially designed and/or equipped. A "wiper blade adapter" in this context should be particularly taken to mean an adapter which is provided to supply a coupling region of the wiper blade device for a coupling with a wiper arm. A "wind deflector element" in this context should be particularly understood to mean an element which is provided to deflect an air stream acting on the wiper blade device and/or is used to press the wiper lip onto a vehicle windscreen. The wind deflector element preferably exhibits at least one concave surface. In an additional embodiment of the invention, the wiper strip element exhibits a longitudinal guide channel, which is provided to receive a carrier element in a form-fitted manner. A "longitudinal guide channel" in this context should be taken to mean a guide channel which extends in a main extension direction parallel to a longitudinal direction of the wiper strip unit in the mounted state. A "longitudinal direction" in this context should be particularly understood to mean a direction which extends substantially parallel to a longitudinal extension of the carrier element. A "longitudinal extension" in this context should be particularly understood to mean a largest possible extension. "Substantially" in this context should be particularly understood to mean a deviation smaller than 10°, preferably smaller than 5°. An "extension" of an element in this context should be particularly understood to mean a maximum distance between two points on a perpendicular projection of the element on a plane. A "carrier element" in this context should be particularly understood to mean a spring-elastic element which exhibits at least one extension, said extension being elastically variable in a normal operating state by at least 10%, particularly by at least 20%, preferably by at least 30% and particularly advantageously by at least 50%, and which generates a counter-force, which is particularly dependent on a change in the extension and is preferably proportional to said change, which counteracts the change.

In a further embodiment of the invention it is proposed that at least one wind deflector element creates a form fit with the wiper strip element in a mounted state, by virtue of which particularly easy assembly of the wiper blade device can be achieved.

If the wiper blade device exhibits a wiper blade adapter which creates a form fit with at least one wind deflector element of the wind deflector unit in a mounted state, a particularly simple and secure coupling with a further component, such as a wiper arm, can be produced.

If the wiper strip unit comprises a spring-elastic carrier element which creates a form fit with the wiper strip element in a mounted state, the carrier element can be securely held in the wiper strip unit.

If the wiper blade device exhibits a wiper blade adapter which creates a form fit with the wiper strip element in a mounted state, a particularly simple and secure coupling with a further component, such as a wiper arm, can be produced.

In addition, it is proposed that the wiper blade adapter exhibits a longitudinal guide unit, which is provided to receive the carrier element in a form-fitted manner, by virtue of which a particularly secure hold of the carrier element can be achieved. In this context, a "longitudinal guide unit" should be particularly taken to mean a unit which is provided to supply a guide for a carrier element in the longitudinal direction. The longitudinal guide unit preferably exhibits at least one guide groove extending in the longitudinal direction, which is provided to create a form fit with the carrier unit.

A secure connection of the wind deflector element to the wiper strip element can be achieved if the wind deflector element exhibits at least one terminating element which creates a form fit in a mounted state, said form fit preventing a movement of at least one wind deflector element relative to the wiper strip element in a longitudinal direction. A "terminating element" in this context should be particularly understood to be an element which is provided to be arranged at a free end of the wind deflector element and to engage with the longitudinal guide channel.

A particularly simple assembly of the wiper blade device can be achieved if the carrier element exhibits at least one latching means, which forms a latching connection to a wiper blade adapter in a mounted state. A "latching means" in this context should be particularly understood to be a means that is provided to produce a latching connection to a spring-elastic component, which is deflected for assembly. The latching means is preferably configured as a latching recess.

If a wiper blade adapter of the wiper blade device is placed on the wiper strip unit, wherein the wind deflector elements are connected to the wiper blade adapter in a form-fitted manner, a particularly simple assembly of the wind deflector elements can be achieved.

If a carrier element is inserted into the wiper strip unit and into a longitudinal guide unit of the wiper blade adapter after the wiper blade adapter has been mounted on the wiper strip unit, the wiper blade adapter can be particularly securely connected to the wiper strip unit.

BRIEF DESCRIPTION OF THE DRAWINGS

Further advantages emerge from the following drawing description. An exemplary embodiment of the invention is depicted in the drawing. The drawing, description and claims contain a combination of numerous features. The person skilled in the art will advantageously also consider the features individually and combine them into further practical combinations.

In the figures.

DETAILED DESCRIPTION

Figure 1:
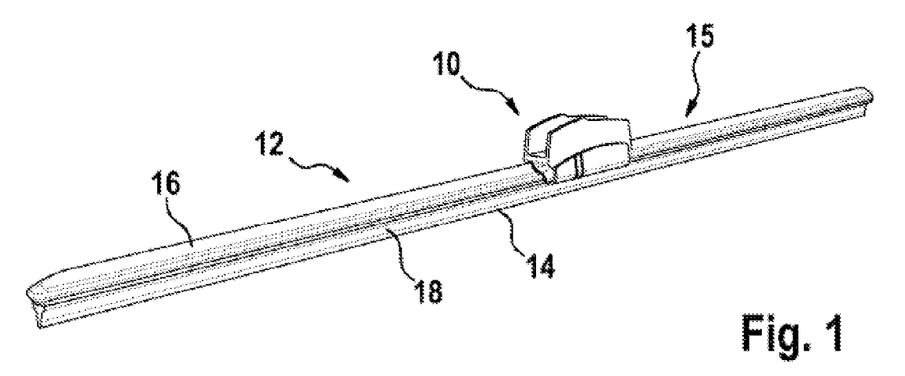
FIG. 1 shows a perspective view of a wiper blade device according to the invention in a mounted state.

FIG. 1 shows a perspective view of a wiper blade device according to the invention with a wiper strip unit 12 which comprises a wind deflector unit 15, a wiper lip 18 and a wiper strip element 14. The wind deflector unit 15 is connected to the wiper strip element 14 in a form-fitted manner. The wiper lip 18 is likewise connected to the wiper strip element 14 in a form-fitted manner.

A wiper blade adapter 10 is attached to the wiper strip unit 12. The wiper blade adapter 10 exhibits a coupling region for coupling to a wiper arm of a vehicle (not shown).

Figure 2:
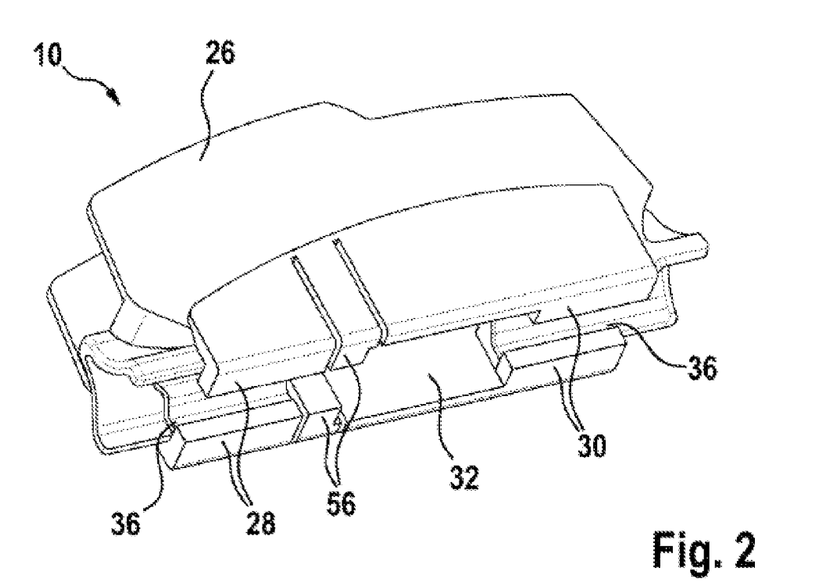
FIG. 2 shows a perspective view of the wiper blade adapter of a wiper blade device according to FIG. 1.

FIG. 2 shows a perspective view of the wiper blade adapter 10, which comprises a basic body 26 on which two fastening means 28, 30 are molded. The fastening means 28, 30 abut a central recess 32 in the basic body 26. In addition, two deflectable latching hooks 56 are disposed on the basic body 26. The latching hooks 56 can be deflected transversely to a main longitudinal extension of the wiper blade adapter 10, which runs parallel to a longitudinal direction 22 of the wiper strip unit 12 in a mounted state. The longitudinal direction 22 extends parallel to a longitudinal extension of the wiper strip unit 12. In addition, four guide grooves 36 abut the central recess 32.

The wiper blade adapter 10 contains a longitudinal guide unit 34, which comprises four guide grooves 36. The guide grooves 36 are open relative to one another and extend parallel to the main longitudinal extension of the wiper blade adapter 10.

Figure 3:
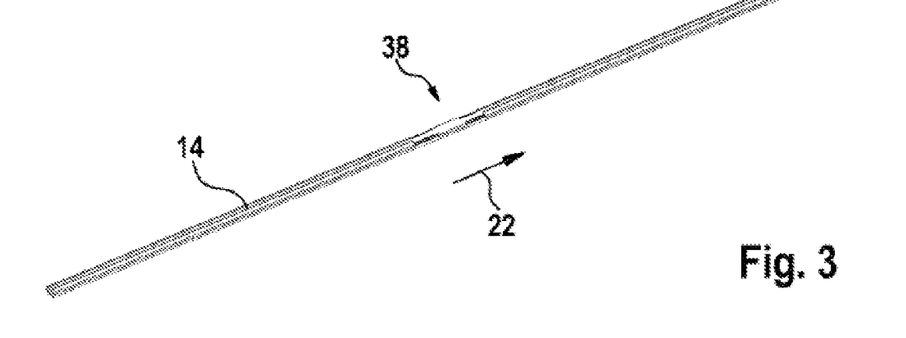
FIG. 3 shows a perspective view of a wiper strip element of a wiper blade device according to FIG. 1.

The wiper strip element 14 is depicted in FIG. 3. The wiper strip element 14 exhibits a wiper blade adapter receiving region 38, which extends over between 45% and 55% of a longitudinal extension of the wiper strip element 14 viewed in the longitudinal direction 22.

Figure 4:
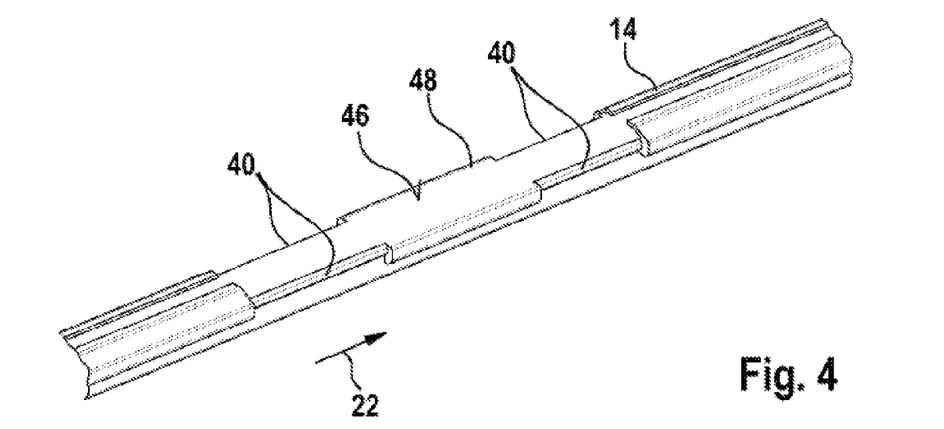
FIG. 4 shows a perspective view of a wiper blade adapter receiving region of the wiper strip element according to FIG. 3.

As shown in greater detail in FIG. 4, the wiper strip element 14 exhibits four fastening recesses 40 in its wiper blade adapter receiving region 38. The fastening recesses 40 abut a bearing surface 46. The bearing surface 46 is located on a bearing body 48, which is arranged centrally in the wiper blade adapter receiving region 38.

Figure 5:
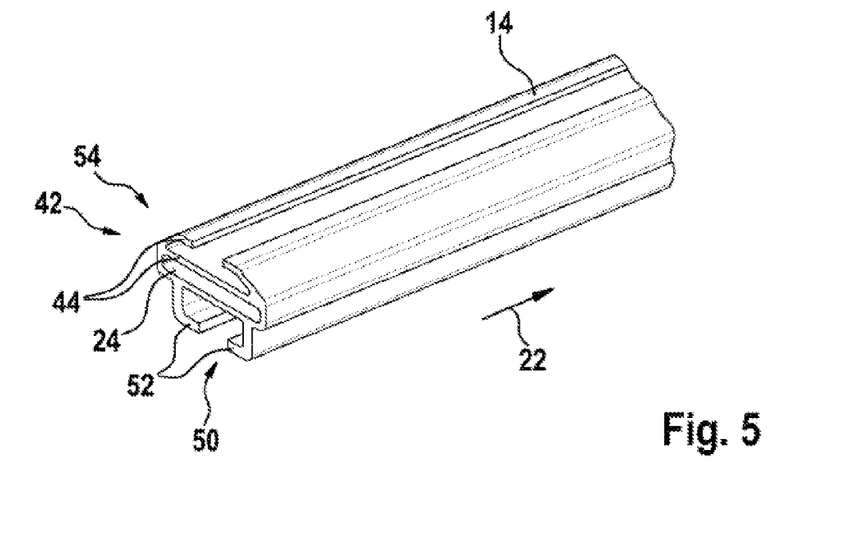
FIG. 5 shows a perspective view of an end region of the wiper strip element according to FIG. 3.

A longitudinal guide channel 24 for receiving a spring-elastic carrier element 20 runs in the longitudinal direction 22 in the wiper strip element 14, as illustrated in FIG. 5 in an end region 54 of the wiper strip element 14. The longitudinal channel 24 exhibits a cross-section which is identical to that of the carrier element 20. When the carrier element 20 is inserted into the longitudinal guide channel 24, a form fit is created. The longitudinal guide channel 24 is continued within the bearing body 48 in the wiper blade adapter receiving region 38.

On one side of the wiper strip element 14 there is a guide unit 42 exhibiting a profile rail 44 for securing the wind deflector unit 15. The profile strip 44 extends in its main extension parallel to the longitudinal direction 22.

On a side lying opposite the guide unit 42, a wiper lip guide unit 50 of the wiper strip element 14 is arranged, said wiper strip element comprising two L-shaped guide profiles 52. Within the wiper lip guide unit 50, a coupling component of the wiper lip 18 is arranged in a mounted state and creates a form fit with the guide profiles 52.

Figure 6:
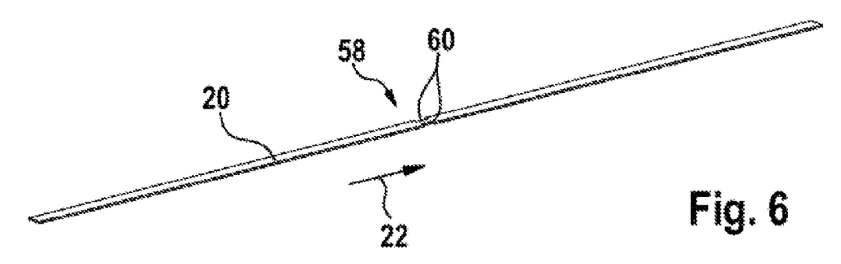
FIG. 6 shows a perspective view of a carrier element of a wiper strip unit according to FIG. 3.
Figure 7:
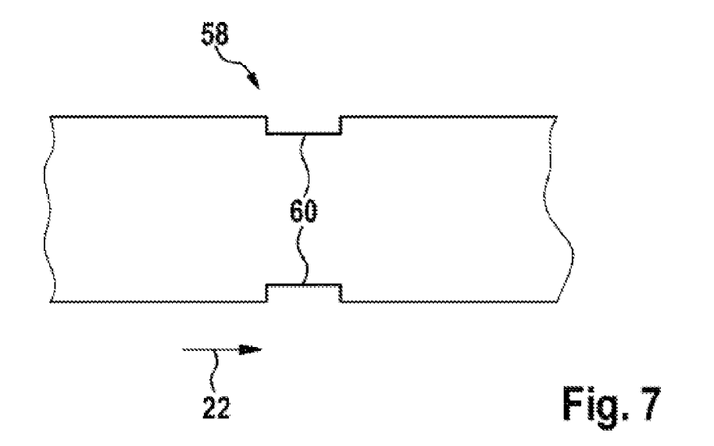
FIG. 7 shows a top view of a section of the carrier element according to FIG. 6.

FIG. 6 shows a spring-elastic carrier element 20 of the wiper strip unit 12. The carrier element 20 is made of spring steel and exhibits a centrally disposed latching means 58 which comprises two latching recesses 60. The latching recesses 60 are punched out of the spring steel and exhibit a rectangular profile, as shown in FIG. 7 as a top view. The latching recesses 60 are arranged at the same height, viewed in the longitudinal direction 22. Furthermore, the carrier element 20 exhibits a thickness which corresponds to a width of the guide grooves 36.

Figure 8:
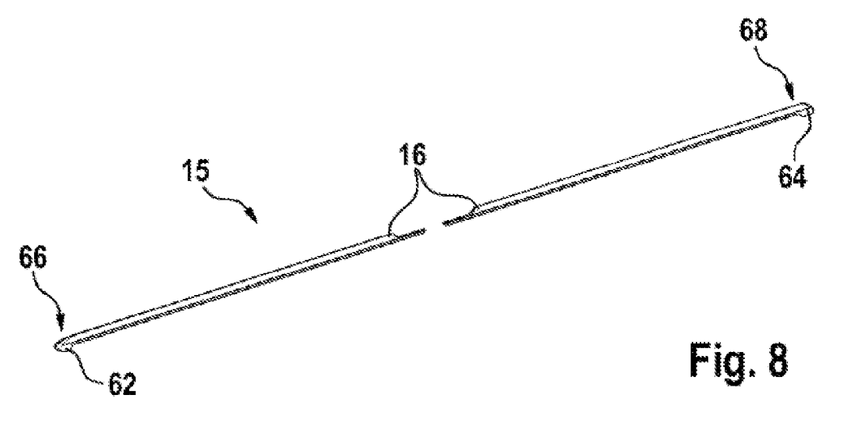
FIG. 8 shows a perspective view of a wind deflector unit of the wiper blade device according to FIG. 1.

The wind deflector unit 15, as shown in FIG. 8, exhibits two wind deflector elements 16 configured separately from one another. The wind deflector elements 16 each comprise a terminating element 62, 64, which are arranged in end regions 66, 68 of the wind deflector unit 15. The end regions 66, 68 are each located, starting from a free end of each wind deflector element 16, within the first or last 10% of a longitudinal extension of the wind deflector element 16. The terminating elements 62, 64 have an identical cross-section to the longitudinal guide channel 24 of the wiper strip element 14. The terminating elements 62, 64 engage with the longitudinal guide channel 24 in a mounted state.

Figure 9:
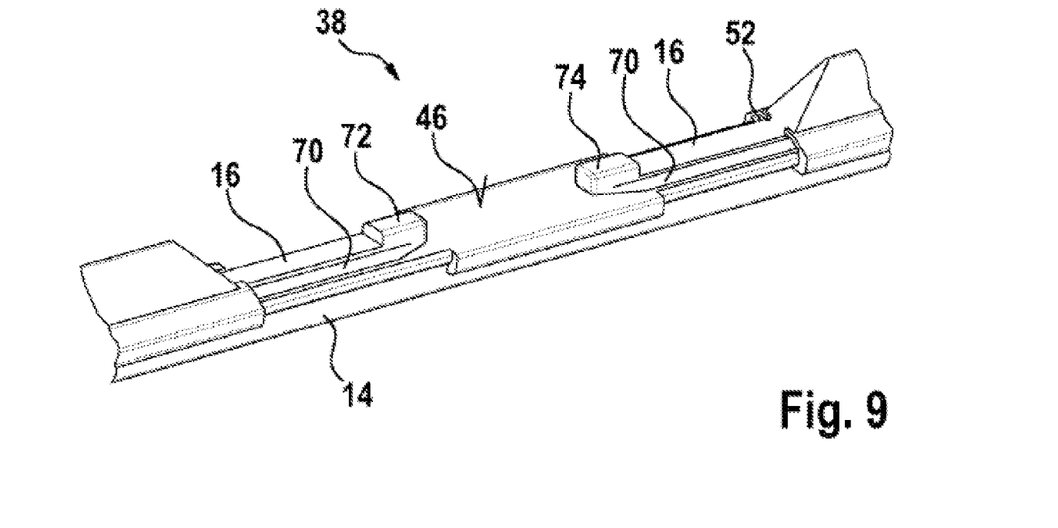
FIG. 9 shows a perspective view of the wiper blade device according to FIG. 1 in a first assembly step.

FIG. 9 depicts a first assembly step of the wiper blade device. The wind deflector elements 16 are inserted into the guide profile 52 of the wiper strip element 14 in the opposite direction. Two longitudinal prolongations 70 of the wind deflector elements 16 engage with the guide profile 52 in this case. The wind deflector elements 16 thereby create a form fit with the wiper strip element 14.

In the wiper blade adapter receiving region 38 of the wiper strip element 14, fastening projections 72, 74 are molded on the wind deflector elements 16, which extend vertically away from the bearing surface 46.

Figure 10:
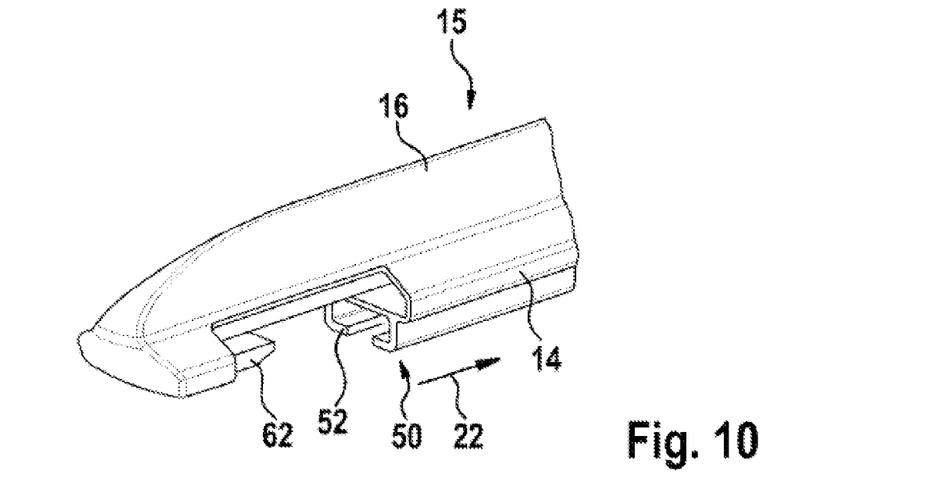
FIG. 10 shows a perspective view of the wiper blade device according to FIG. 1 in a second assembly step.

The terminating element 62 is then introduced into the guide profile 52, thereby avoiding a movement of the wind deflector element 16 relative to the wiper strip element 14 in the longitudinal direction 22 (FIG. 10).

Figure 11:
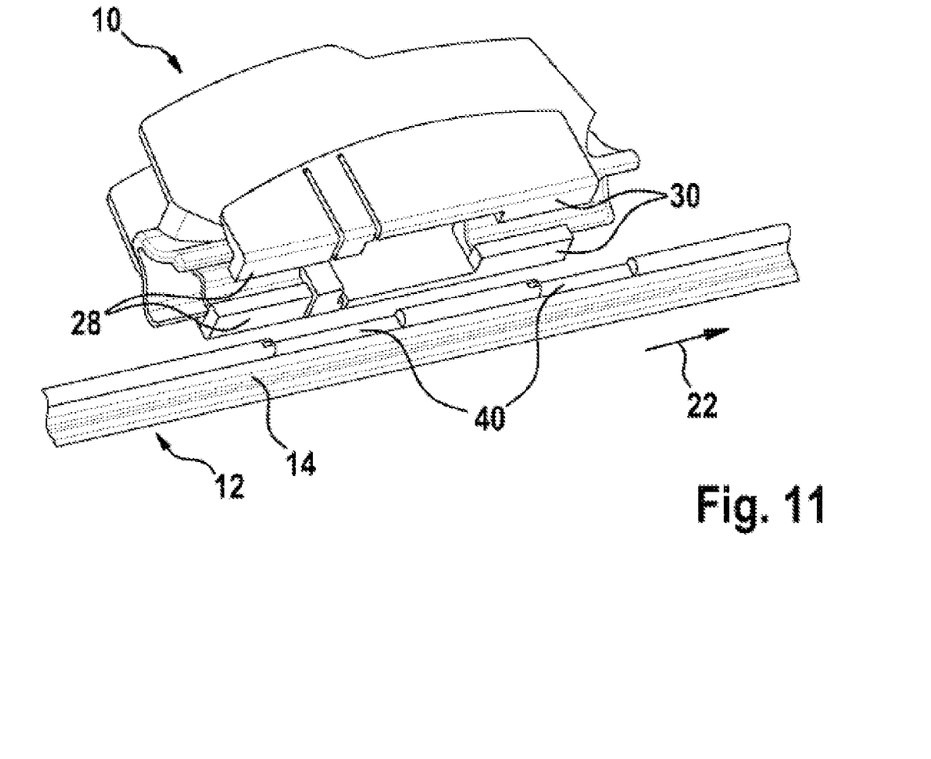
FIG. 11 shows a perspective view of the wiper blade device according to FIG. 1 in a third assembly step.
Figure 12:
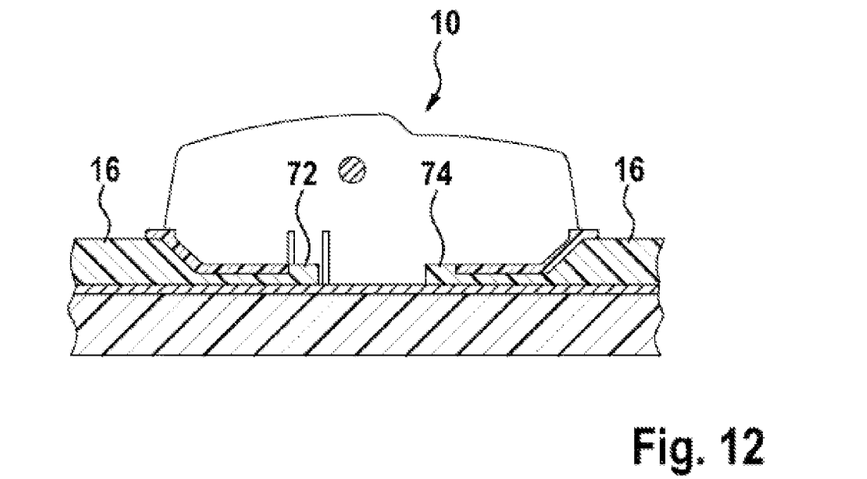
FIG. 12 shows a sectional view through the wiper blade adapter according to FIG. 2 in a mounted state and FIG. 13 shows a perspective view of the wiper blade device according to FIG. 1 in a fourth assembly step.

In a second assembly step, as shown in FIG. 11, the wiper blade adapter 10 is placed on the wiper strip element 14. The fastening means 28, 30 of the wiper blade adapter 10 in this case engage in a form-fitting manner with the fastening recesses 40 of the wiper strip element 14. The wiper blade adapter 10 lies on the bearing surface 46 in a fitted state and creates a form fit with the wiper strip element 14. A movement of the wiper strip element 14 relative to the wiper blade adapter 10 is avoided in the longitudinal direction 22. In addition, the wiper blade adapter 10 encloses the fastening projections 72, 74 of the wind deflector elements 16, as shown in FIG. 12. The wiper blade adapter 10 thereby creates a form fit with the wind deflector elements 16.

In a third assembly step, the wiper lip 18 is inserted in the wiper lip guide unit 50 and creates a form fit therewith. The wiper strip element 14 thereby creates a form fit with the wiper lip 18 in a mounted state. In addition, the carrier element 20 is introduced into the longitudinal guide channel 24 of the wiper strip element 14. The carrier element 20 thereby creates a form fit with the wiper strip element 14 in an assembled state. In the wiper blade adapter receiving region 38 the carrier element 20 leaves the longitudinal guide channel 24 and is then guided in the longitudinal guide unit 34 of the wiper blade adapter 10.

Figure 13:
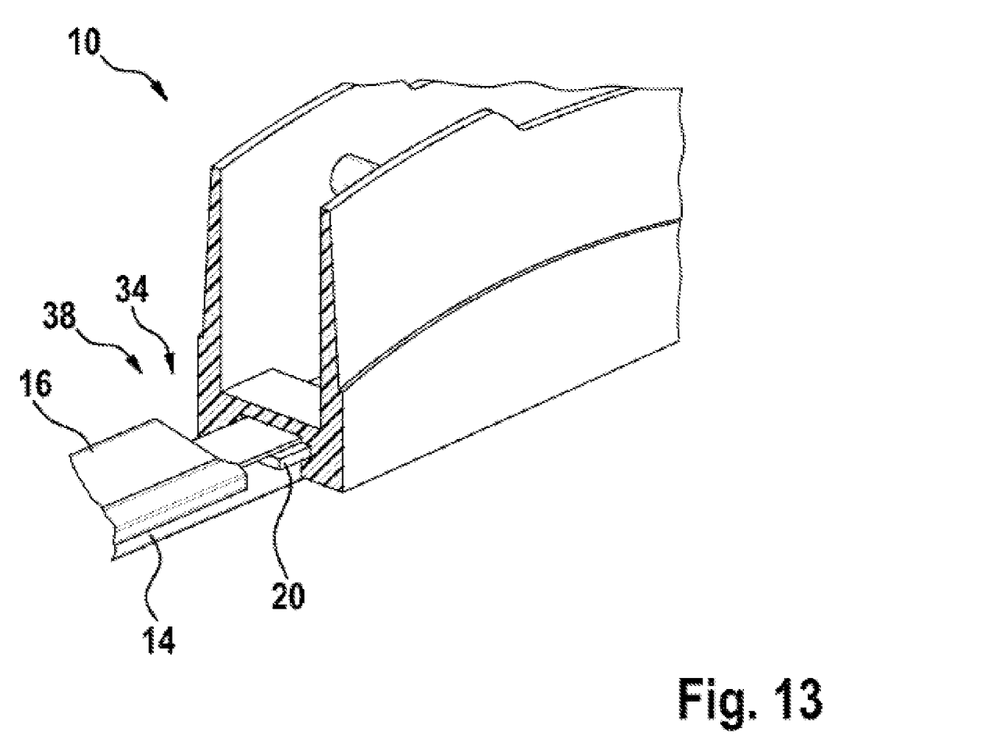

FIG. 13 shows the carrier element 20, which is completely pushed through the longitudinal guide unit 34. The carrier element 20 creates a form fit with the wiper blade adapter 10. The wiper blade adapter 10 can therefore no longer be separated from the wiper strip unit 12, but is rigidly connected thereto. The carrier element 20 is pushed further in a fourth assembly step, until it is completely located in the wiper strip unit 12. In order to avoid movement of the carrier element 20 relative to the wiper strip unit 12, the terminating element 64 of the wind deflector element 16 is inserted into the longitudinal guide channel 24 of the wiper strip element 14. The longitudinal guide channel 24 and the wiper lip guide unit 50 are thereby sealed in their two end regions 54. A movement of the carrier element 20 within the longitudinal guide channel 24 is avoided in each direction.

The carrier element 20 is furthermore secured by the latching hooks 56 of the wiper blade adapter 10, which engage with the latching recesses 60 of the carrier element 20 and create a latching connection.

The latching hooks 56 in this case are initially deflected from a starting position transversely to the longitudinal direction 22 and then move elastically back into the starting position. A form fit is thereby created with the latching recesses 60 and a movement of the carrier element 20 relative to the wiper blade adapter 10 in the longitudinal direction 22 is avoided.

What is claimed is:

1. A wiper blade device with a wiper strip unit (12) which comprises a wiper strip element (14), a spring elastic carrier element (20), a wind deflector unit (15) and a wiper lip (18), wherein the wind deflector unit (15) includes at least two wind deflector elements (16) spaced separately from one another along a longitudinal direction (22) and releasably coupled to the wiper strip element (14), wherein the wiper blade device further comprises a wiper blade adapter (10) which creates a form fit with the wiper strip element (14) in a mounted state generally in a central region of the wiper strip element (14) along the longitudinal direction, wherein the wiper blade adapter (10) includes a longitudinal guide unit (34), which includes a channel that receives the carrier element (20) in a form-fitted manner along the longitudinal direction (22), wherein the longitudinal guide unit (34) and the carrier element (20) are configured such that an end of the carrier element (20) is pushed solely along the longitudinal direction (22) through the entire channel to couple the carrier element (20) to the wiper blade adapter (10), wherein after the carrier element (20) has been pushed through the longitudinal guide unit (34) and is in the mounted state, the wiper blade adapter (10) can no longer be separated from the carrier element (20) and the wiper strip element (14), wherein at least one of the wind deflector elements (16) creates a form fit with the wiper strip element (14) in the mounted state, wherein the wiper blade adapter (10) creates a form fit with the at least one of the wind deflector elements (16) in the mounted state, wherein the wiper strip element (14) includes a longitudinal channel (24) that receives the carrier element (20) and a guide profile (52) that receives the wiper lip (18), wherein the at least one of the wind deflector elements (16) includes at least one terminating element (62, 64) of unitary, one piece construction therewith which extends along the longitudinal direction (22) into the guide profile (52) in the mounted state.

2. The wiper blade device as at least claimed in claim 1, characterized in that the carrier element (20) includes at least one latching means (58), which forms a latching connection to the wiper blade adapter (10) in a mounted state.

3. The wiper blade device as claimed in claim 2, wherein the latching means (58) includes two latching recesses (60) along opposite sides of the carrier element (20), wherein the latching recesses (60) are open notches formed along the sides of the carrier element (20), and wherein the wiper blade adapter (10) includes latching hooks (56) that engage into the latching recesses (60).

4. The wiper blade device as claimed in claim 3, wherein the two latching recesses (60) are each positioned at an identical longitudinal position along the longitudinal direction (22).

5. The wiper blade device as claimed in claim 3, wherein the latching hooks (56) engage inwardly toward one another into the two latching recesses (60) along a direction perpendicular to the longitudinal direction (22).

6. The wiper blade device as claimed in claim 1, wherein the wind deflector elements (16) each include a fastening projection (72, 74) that engages the wiper blade adapter (10) in the mounted state to prevent the wind deflector elements (16) from being pulled apart from one another.

7. A wiper blade device with a wiper strip unit (12) which comprises a wiper strip element (14), a spring elastic carrier element (20), a wind deflector unit (15) and a wiper lip (18), wherein the wind deflector unit (15) includes at least two wind deflector elements (16) spaced separately from one another along a longitudinal direction (22) and releasably coupled to the wiper strip element (14), wherein the wiper blade device has an overall length along the longitudinal direction, wherein the wiper strip element (14) extends at least substantially the entire overall length of the wiper blade device, wherein the wiper blade device further comprises a wiper blade adapter (10) which creates a form fit with the wiper strip element (14) in a mounted state generally in a central region of the wiper strip element (14) along the longitudinal direction, wherein the wiper blade adapter (10) includes a longitudinal guide unit (34), which includes a channel that receives the carrier element (20) in a form-fitted manner along the longitudinal direction (22), such that an end of the carrier element (20) is configured to be pushed solely along the longitudinal direction (22) through the entire channel to couple the carrier element (20) to the wiper blade adapter (10), wherein after the carrier element (20) has been pushed through the longitudinal guide unit (34) and is in the mounted state, the wiper blade adapter (10) can no longer be separated from the carrier element (20) and the wiper strip element (14), wherein at least one of the wind deflector elements (16) creates a form fit with the wiper strip element (14) in the mounted state, wherein the wiper blade adapter (10) creates a form fit with the at least one of the wind deflector elements (16) in the mounted state, wherein the wiper strip element (14) includes a longitudinal channel (24) that receives the carrier element (20) and a guide profile (52) that receives the wiper lip (18), wherein the wind deflector elements (16) each include a terminating element (62, 64) of unitary, one piece construction therewith which extend toward one another along the longitudinal direction (22) into the guide profile (52) in the mounted state.

8. The wiper blade device as claimed in claim 7, wherein the carrier element (20) includes at least one latching means (58), which forms a latching connection to the wiper blade adapter (10) in a mounted state.

9. The wiper blade device as claimed in claim 8, wherein the latching means (58) includes two latching recesses (60) along opposite sides of the carrier element (20), wherein the latching recesses (60) are open notches formed along the sides of the carrier element (20), and wherein the wiper blade adapter (10) includes latching hooks (56) that engage into the latching recesses (60).

10. The wiper blade device as claimed in claim 9, wherein the two latching recesses (60) are each positioned at an identical longitudinal position along the longitudinal direction (22).

11. The wiper blade device as claimed in claim 9, wherein the latching hooks (56) engage inwardly toward one another into the two latching recesses (60) along a direction perpendicular to the longitudinal direction (22).

12. The wiper blade device as claimed in claim 7, wherein the wind deflector elements (16) each include a fastening projection (72, 74) that engages the wiper blade adapter (10) in the mounted state to prevent the wind deflector elements (16) from being pulled apart from one another.

* * * * *